Nov. 21, 1961 R. P. BEAUVAIS 3,009,163
SPECTACLE MASK HAVING A FESTIVE MOTIF
Filed Dec. 5, 1958 2 Sheets-Sheet 2

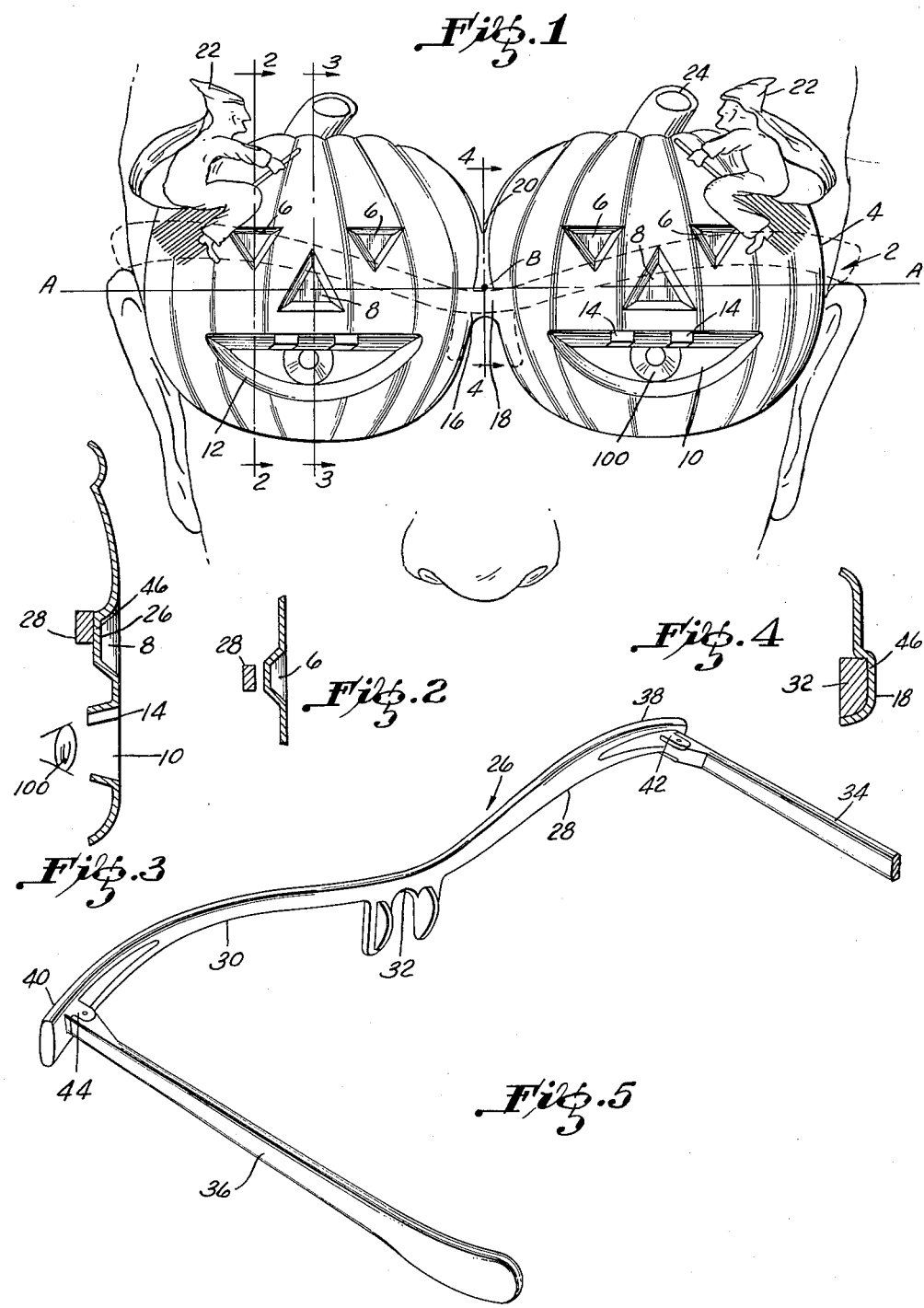

United States Patent Office 3,009,163
Patented Nov. 21, 1961

3,009,163
SPECTACLE MASK HAVING A
FESTIVE MOTIF
Ramona P. Beauvais, Leominster, Mass., assignor to Foster Grant Co., Inc., Leominster, Mass., a corporation of Delaware
Filed Dec. 5, 1958, Ser. No. 778,451
8 Claims. (Cl. 2—206)

This invention relates to a novelty spectacle mask having a festive motif comprising spectacle-like frame supporting means attached thereto for positioning in front of the eyes of the wearer.

More particularly, this invention relates to a novelty three dimensional molded spectacle mask having a festive motif comprising, in combination, a three dimensional molded blank formed from a sheet material and including a pair of connected disc-like members, each member being the substantial replica of an animate or inanimate subject, viz. a tiger or leopard face or a Halloween pumpkin. Between and connecting said disc-like members is a connecting portion including a nose bridge rest shaped portion. Each disc-like member has a viewing slot therethrough, and attached to said molded blank, preferably at at least one portion of the rear surface thereof, is a spectacle-like frame including frontal members, a nose bridge rest portion connecting said frontal members, and temples connected to the frontal members at their respective end portions. The respective nose bridge portions are preferably positioned in coinciding relationship with each other. Each frontal member is preferably constructed that it tapers downwardly from each end portion thereof to which the temple is connected towards the nose bridge portion, and each said end portion is positioned above the viewing slot of each disc-like member. The disc-like members each have the configuration and is a substantial replica of a festive subject in accordance with the season or holiday during which the mask is to be used. For example, each disc may be in the form of a heart for Valentine's day, in the form of a turkey for Thanksgiving day, in the form of a wreath or a Christmas tree for Christmas day, and in the form of a pumpkin or of a brightly colored face of any member of the feline family, viz. leopard, tiger, and cat, for Halloween. In those instances where the disc-like member is in the form of a pumpkin or subject which has an oral opening, the viewing slot is positioned in and through the disc-like member at that portion thereof having said oral opening, viz. the mouth. The front of the molded disc-like member is preferably colored in the distinctive colors for the respective seasons. For example, the pumkin eyes and nose and the mouth edge portions of the Halloween pumpkin are yellow while the remainder is orange.

The mask of my invention does not have any moving parts and is adaptable to any festive motif. The mask is preferably formed from sheet material such as paper coated with an organic resin material which is preferably thermosetting. The so-coated resin paper is preferably formed by using suitable combination cutting and forming dies and by positioning a blank of said so-coated resin paper between said dies, consisting of a male and female member, bringing the male die into contact with the blank positioned on the female die to cut and shape said blank into the pair of disc-like members of the desired configuration and replica, and molding said so-shaped blank under temperature and pressure conditions required by the utilized resin coating material. Thusly, are the shaped, preferably three dimensional, connected disc-like members formed, and the resin may be colored as desired preferably before the cutting and molding step. This cutting and molding process utilizing said dies for cutting and shaping resin coated web material, viz. paper, is well known in the art and is recited here for purposes of clearly describing the method for making the mask of my invention.

In instances wherein the disc-like members are substantially circular, as, for example, where each disc-like member is the substantial replica of a pumpkin, the viewing slot is positioned in and through the pumpkin mouth, beneath the horizontal center line of said disc-like members. Each frontal member of the spectacle-like supporting means tapers downwardly from each end portion to which the temple is connected towards and to the nose bridge rest portion of said supporting means, each of said end portions to which the temples are connected being above the horizontal center line of said connected disc-like members. The nose bridge rest of said spectacle-like frame coincides with the nose bridge rest portion of the portion connecting said disc-like members and is attached thereto at its rear surface portion, as by an adhesive composition.

The novelty spectacle mask of my invention is simple and economical to make and is so constructed that it conceals the eyes of the wearer while providing sufficient visibility to enable the wearer to go from place to place.

An object of this invention is to provide a novelty spectacle mask having a festive motif comprising a molded blank including a pair of disc-like members, each of said members being the substantial replica of an animate or an inanimate subject.

Another object of this invention is to provide a novelty spectacle mask having a festive motif which is easily and economically made.

A further object of this invention is to provide a novelty spectacle mask having a festive motif comprising a molded three dimensional blank including a pair of disc-like members, each of said members being the substantial replica of an animate or an inanimate subject and a spectacle-like frame member attached to said pair of disc-like members as a supporting means therefor.

Other objects and features will become readily apparent from the following detailed description which is not limiting but illustrative of the preferred embodiments of my invention.

FIGURE 1 is a front view of the novelty three dimensional molded spectacle mask having a festive motif comprising the pair of connected disc-like members, each being a replica of an inanimate subject, viz. a Halloween pumpkin.

FIGURE 2 is a partial sectional view taken on line 2—2 of FIGURE 1.

FIGURE 3 is a sectional view taken on line 3—3 of FIGURE 1.

FIGURE 4 is a sectional view taken one line 4—4 of FIGURE 1.

FIGURE 5 is a view in perspective of the spectacle-like frame means.

Figure 6:
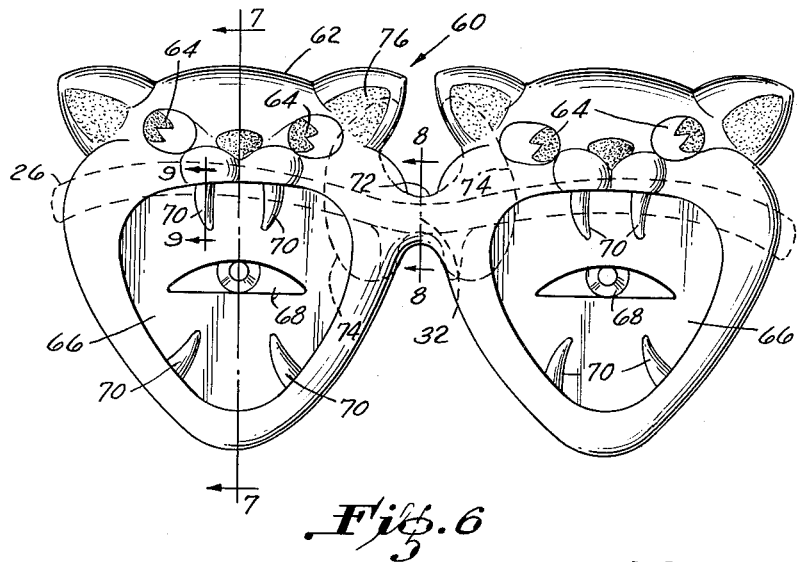
FIGURE 6 is a front view of another embodiment of the novelty three dimensional molded spectacle mask having a festive motif comprising the pair of connected disc-like members each being a replica of an animate subject, viz. a fanciful representation of a leopard face.

More specifically, referring to FIGURE 1, the novelty three dimensional molded spectacle mask 2 consists of the three dimensional molded disc-like members 4, each being the substantial replica of and having the configuration of a Halloween pumpkin. Each disc-like member 4 has the spaced-apart indented triangularly shaped eye portions 6, the indented triangularly shaped nose portion 8, and the slot 10. The slot 10 has at its edge portions the inwardly extending wall 12 and the outwardly protruding teeth portions 14, as clearly shown in FIGURES 1, 2, and 3. As is clearly seen in the appended drawings, the disc-like members are molded in three dimensions. Between and connecting the disc-like members, each having the shape of a Halloween pumpkin, is the connecting portion 16 including the shaped and molded nose bridge rest portion 18 and the remainder 20 of the connecting portion 16. At the upper portions of each disc-like member 4 are the outwardly shaped molded protruding portions 22 in the form of the well-known witch riding her broomstick. Also, extending from the top of each pumpkin 4 is the pumpkin stem portion 24. Attached to said disc-like members 4 is the spectacle-like frame 26 including frontal pieces 28 and 30, the nose bridge rest 32, and the temple members 34 and 36 connected to said frontal pieces 28 and 30, respectively, at the respective end portions 38 and 40 thereof, as by hinge means 42 and 44.

The nose bridge rest 32 is in coinciding relationship with nose bridge rest portion 18 and is attached by adhesive material 46 thereto, as clearly seen in FIGURES 1 and 4. Also, the frontal piece 28 and the frontal piece 30, at respective portions thereof, are each attached by adhesive material 46 to the back surface of the indented nose 8, as clearly seen in FIGURES 1 and 3. Also, as clearly seen in FIGURES 1 and 2, the respective frontal pieces 28 and 30 will be slightly spaced from the back surface of the indented eye portions 6. Thusly, the spectacle-like frame member 26 is a means for supporting the disc-like members 4 in front of the eyes 100 of the wearer, as clearly seen in FIGURE 1. The eye portions 6, the nose portions 8, the slot wall portions 12, and the teeth portions 14 are colored yellow, the witch and broomstick portions 22 are black, the stem portions 24 are colored a yellow-orange, and the remainder of the pumpkin replicas is colored orange, all colors being well known and widely used Halloween colors, particularly with respect to pumpkins. The spectacle-like frame 26, and particularly the frontal pieces 28 and 30 and the nose bridge rest 32, are shown in dotted lines in FIGURE 1.

As is clearly seen in the appended drawings, the frontal pieces 28 and 30 taper downwardly from the respective end portions 38 and 40 towards the nose bridge rest 32 in such a manner that said entire frontal pieces are positioned above the horizontal center line A—A of the disc-like members 4, said horizontal center line passing through point B on the nose bridge rest 18. The viewing slots 10 are positioned in front of the eyes 100 of the wearer and the temples 34 and 36 engage the ears of the wearer, as clearly shown in FIGURES 1 and 3, thereby enabling the viewer to have full visibility while wearing the mask 2.

Figure 7:
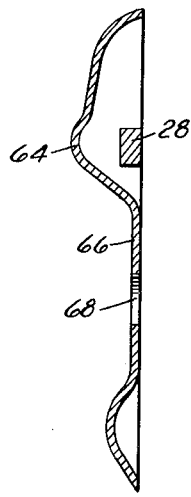
FIGURE 7 is a sectional view taken on line 7—7 of FIGURE 6.
Figure 8:
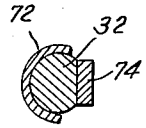
FIGURE 8 is a sectional view taken on line 8—8 of FIGURE 6.
Figure 9:
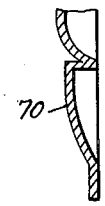
FIGURE 9 is a sectional view taken on line 9—9 of FIGURE 6.

Referring to FIGURE 6, the novelty three dimensional molded spectacle mask 60 consists of the three dimensional molded disc-like members 62, each being the substantial replica of and having the configuration of a fanciful and grotesque representation of a member of the feline family, such as the leopard, such as is widely used during Halloween. Each member 62 has the spaced apart partially spherical eye portions 64 which may be colored to represent eyes, the indented mouth portion 66 having the viewing slot 68 therethrough, and the protruding molded and shaped teeth portions 70, as clearly shown in FIGURES 6, 7, and 9. Here again in this embodiment, the disc-like members 62 are molded in three dimensions. Between and connecting the disc-like members 62 is the connecting nose bridge rest 72. Attached to said disc-like members 62 at the molded nose bridge rest 32, which is somewhat cupped, as clearly shown in FIGURE 8, is the nose bridge rest 32 of the spectacle-like frame 26. The nose bridge rest 32 of the frame 26 coincides with and is positioned within the molded cupped nose bridge rest 72, as clearly shown in FIGURE 8. Attaching member 74 is so positioned over nose bridge rest 32 positioned within molded nose bridge rest 72 that it holds said rest 32 against the rear surface of rest 72. Portions of 74 are adhesively attached to the rear surfaces of the ear portions 76 and to the rear surface of the indented mouth portion 66, as clearly shown in FIGURES 6 and 8. The attaching member 74 is formed of paper or thin cardboard and is shaped as clearly shown by the dotted lines in FIGURE 6. Also, the spectacle-like frame 26 is shown by the dotted lines in FIGURE 6. The temples 34 and 36 engage the ears of the wearer and the slots 68 are positioned in front of the eyes of the wearer.

The indented mouth portion 66 is colored orange, the teeth 70 are colored white, the eyes 64 are colored black and white, the ears 76 are colored orange and black, and the remainder of the disc-like members 62 is black, all widely used and well known Halloween colors.

Of course, other appropriate color schemes are used in instances where the disc-like members have the configuration of and are the replicas of other festive subjects such as a heart, for Valentine's day, or a turkey for Thanksgiving day, or a wreath or Christmas tree or Santa Claus for Christmas day. In each instance, the viewing slot through each disc-like member is positioned below the frontal pieces of the spectacle-like frame support therefor and is through the mouth portion of the replica, if such replica does have a mouth portion, or is through the lower portion thereof where the replica has not any mouth portion.

Many alterations and changes may be made without departing from the spirit and scope of this invention which is set forth in the appended claims which are to be construed as broadly as possible in view of the prior art.

I claim:

1. A novelty spectacle mask having a festive motif comprising, in combination, a blank including a pair of connected disc-like members, each member having the configuration of and being the substantial replica of one of any animate subject and any inanimate subject, and a connecting portion between and connecting said disc-like members, said connecting portion being in the shape of a nose bridge rest, each of said disc-like members having a viewing slot therethrough, and means for supporting said viewing slot portions of said disc-like members in front of and in the line of vision of the eyes of the wearer, said means being attached, at at least one portion thereof, to said blank and including temples for engaging the ears of the wearer.

2. A novelty molded spectacle mask having a festive motif comprising, in combination, a molded blank including a pair of connected disc-like members, each member having the configuration of and being a three dimensional replica of one of any inanimate subject and any animate subject, and a connecting portion between and connecting said disc-like members, said connecting portion being in the shape of a nose bridge rest, each of said disc-like members having a viewing slot therethrough, and means for supporting said viewing slot portions of said disc-like members in front of and in the line of vision of the eyes of the wearer, said means being attached, at at least one portion thereof, to said molded blank and including temples for engaging the ears of the wearer.

3. A novelty spectacle mask having a festive motif comprising, in combination, a blank including a pair of connected disc-like members, each member having the configuration of and being the substantial replica of one of any animate subject and any inanimate subject, and a connecting portion between and connecting said disc-like members, said connecting portion being in the shape of a nose bridge rest, each of said disc-like members having a viewing slot therethrough, and means for supporting said viewing slot portions of said disc-like members in front of and in the line of vision of the eyes of the wearer, said means being attached at at least one portion thereof to said blank, said means comprising frontal members, a nose bridge rest connecting said frontal members, and temple members attached to said frontal members at the respective end portions thereof, said nose bridge rest of said supporting means coinciding with said nose bridge rest shaped connecting portion of said blank.

4. A novelty molded spectacle mask having a festive motif comprising, in combination, a molded blank including a pair of connected disc-like members, each member having the configuration of and being a three dimensional replica of one of any inanimate subject and any animate subject, and a connecting portion between and connecting said disc-like members, said connecting portion being in the shape of a nose bridge rest, each of said disc-like members having a viewing slot therethrough, and means for supporting said viewing slot portions of said disc-like members in front of and in the line of vision of the eyes of the wearer, said means being attached, at at least one portion thereof, to said molded blank, said means comprising frontal members, a nose bridge rest connecting said frontal members, and temple members at the respective end portions thereof, said nose bridge rest of said supporting means coinciding with said nose bridge rest shaped connecting portion of said molded blank.

5. A novelty spectacle mask having a festive motif comprising, in combination, a blank including a pair of connected disc-like members, each member being the substantial replica of one of any inanimate subject and any animate subject, and a connecting portion between and connecting said disc-like members, said connecting portion including a nose bridge rest portion, each of said disc-like members having a viewing slot therethrough, and means for supporting said viewing slot portions of said disc-like members in front of and in the line of vision of the eyes of the wearer, said means being attached, at at least one portion thereof, to said blank.

6. A novelty molded spectacle mask having a festive motif comprising, in combination, a molded blank including a pair of connected disc-like members, each member being a three dimensional replica of one of any inanimate subject and any animate subject, and a connecting portion between and connecting said disc-like members, said connecting portion including a nose bridge rest portion, each of said disc-like members having a viewing slot therethrough, and means for supporting said viewing slot portions of said disc-like members in front of and in the line of vision of the eyes of the wearer, said means being attached, at at least one portion thereof, to said blank.

7. A novelty spectacle mask having a festive motif comprising, in combination, a blank including a pair of connected disc-like members, each member being the substantial replica of one of any inanimate subject and any animate subject, and a connecting portion between and connecting said disc-like members, said connecting portion including a nose bridge rest portion, each of said disc-like members having a viewing slot therethrough, and means for supporting said viewing slot portions of said disc-like members in front of and in the line of vision of the eyes of the wearer, said means being attached, at at least one portion thereof, to said blank, said means including a nose bridge rest, said nose bridge rest of said supporting means coinciding with said nose bridge rest shaped portion of said connecting portion of said blank.

8. A novelty molded spectacle mask having a festive motif comprising, in combination, a molded blank including a pair of connecting disc-like members, each member being a three dimensional replica of one of any inanimate subject and any animate subject, and a connecting portion between and connecting said disc-like members, said connecting portion including a nose bridge rest portion, each of said disc-like members having a viewing slot therethrough, and means for supporting said viewing slot portions of said disc-like members in front of and in the line of vision of the eyes of the wearer, said means being attached to said blank at at least one portion thereof, said means comprising a spectacle-like frame including frontal members, a nose bridge rest therebetween, and temple members attached to said frontal members at the respective end portions thereof, said nose bridge rest coinciding with said nose bridge rest shaped portion of said connecting portion of said blank, each frontal member tapering downwardly from its end portion toward the nose bridge rest, said end portions of said frontal members being positioned above the respective viewing slot portions of said disc-like members.

References Cited in the file of this patent

UNITED STATES PATENTS

| | | |
|---|---|---|
| D. 184,703 | Beauvais | Mar. 31, 1959 |
| 868,857 | Garner | Oct. 22, 1907 |
| 2,598,107 | Brandvig | May 27, 1952 |
| 2,602,372 | Passet | July 8, 1952 |
| 2,748,528 | Wolf | June 5, 1956 |

FOREIGN PATENTS

| | | |
|---|---|---|
| 671,914 | Germany | Feb. 16, 1939 |